Dec. 26, 1961 N. P. PEET 3,014,787
PRODUCTION OF HYDROGEN AND CARBON MONOXIDE
Filed June 8, 1959
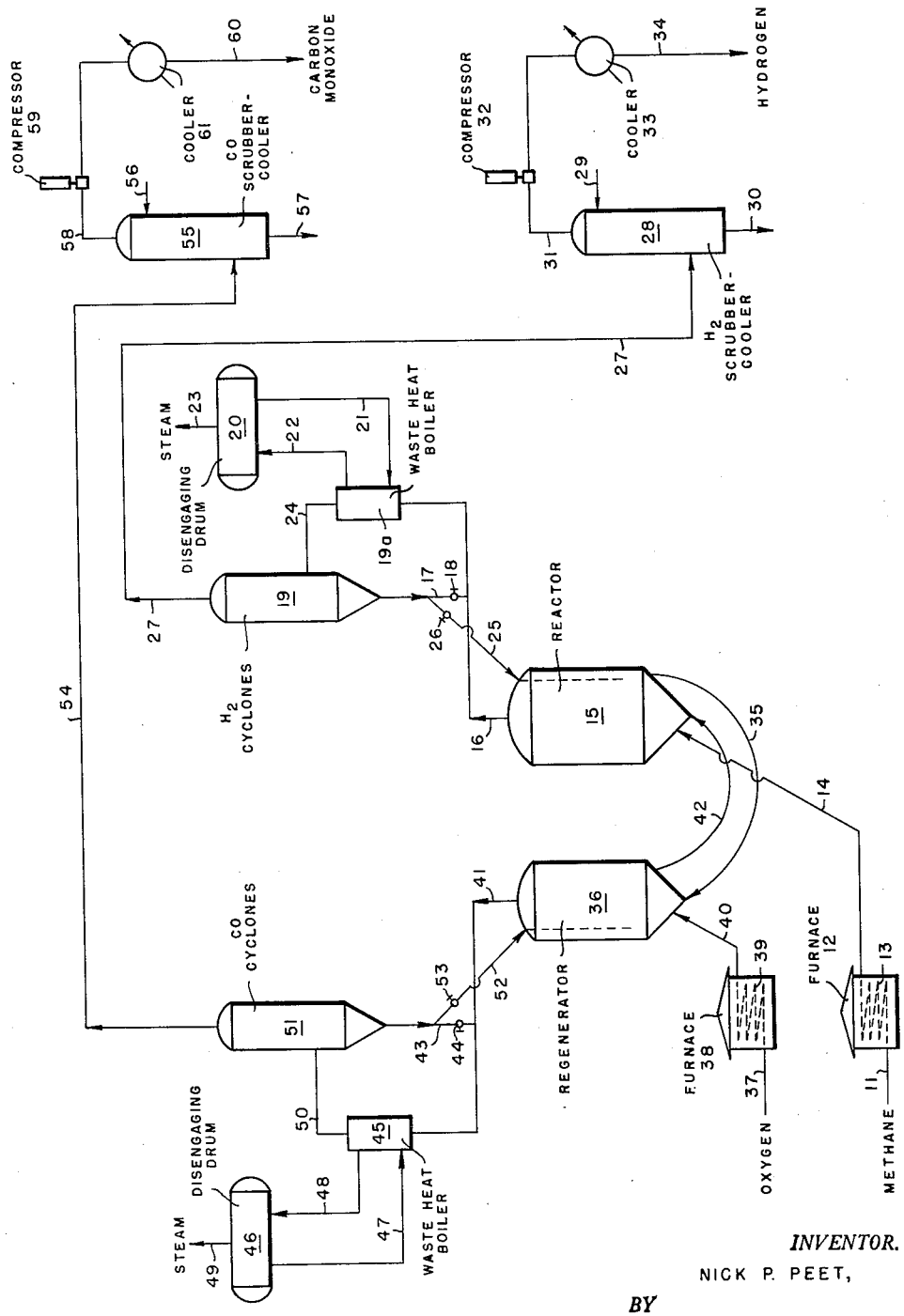
INVENTOR.
NICK P. PEET,
BY
ATTORNEY United States Patent Office 3,014,787
Patented Dec. 26, 1961

3,014,787
PRODUCTION OF HYDROGEN AND CARBON MONOXIDE
Nick P. Peet, Baytown, Tex., assignor, by mesne assignments, to Esso Research and Engineering Company, Elizabeth, N.J., a corporation of Delaware
Filed June 8, 1959, Ser. No. 818,826
9 Claims. (Cl. 23—204)

The present invention is directed to a method of producing hydrogen and carbon monoxide. More particularly, the invention is concerned with control of a reaction in which hydrogen and carbon monoxide are produced. In its more specific aspects, the invention is concerned with the handling of hot gases such as carbon monoxide and hydrogen.

The present invention may be briefly described as a method for producing hydrogen and carbon monoxide in which a feed hydrocarbon is subjected to reaction conditions at temperatures within the range from about 1300° to about 2400° F. in the presence or absence of a dehydrogenation catalyst such that from about 0.5% to about 10% by weight of carbon is deposited on the catalyst and a product is formed containing substantial amounts of hydrogen. The product is separated from the carbon-containing catalyst and the carbon-containing catalyst is subjected to contact with substantially pure oxygen at a temperature within the range from about 1400° to about 2500° F. under conditions to form a second product which contains substantial amounts of carbon monoxide. The catalyst is separated from the second product and the hydrogen- and carbon monoxide-containing products are separately recovered.

Temperatures employed in producing the hydrogen may suitably range from about 1300° to about 2400° F. with preferred operations being in the upper portion of the temperature range. For example, a temperature of 1800° F. gives desirable results.

In producing carbon monoxide, the temperatures may range from about 1400° to about 2500° F. with temperatures in the mid portion of the range being preferred. For example, desirable results are obtained at about 2000° F.

Pressures employed in the practice of the present invention for both the hydrogen and carbon monoxide producing steps may range from about 0 to about 150 pounds per square inch gauge. Desirable operations are conducted at about 30 pounds per square inch gauge.

The hydrocarbon employed in the practice of the present invention may comprise the natural gas hydrocarbons such as methane, ethane, propane, and the butanes, as well as mixtures thereof. These hydrocarbons may also be in admixture with hydrogen as in refinery tail gas. Other hydrocarbons suitably may also be employed such as the liquid hydrocarbons boiling in the gasoline, kerosene, and gas oil boiling ranges. For example, liquid hydrocarbons boiling up to about 750° F. may be satisfactorily employed. Heavier hydrocarbons, especially residual crude petroleum fractions, asphalt, heavy crude petroleum, and the like may be used.

When gaseous hydrocarbons are employed, a gaseous space velocity in the range from about 50 to about 500 volumes of gas per volume of catalyst per hour may be used. Desirable and preferred results are obtained at about 150 v./v./hour. The rate at which the feed is fed may be expressed in a different fashion which will encompass both liquid and gaseous feeds. For example, the hydrocarbon employed may be used at a rate within the range from about 0.03 to about 5 weights of hydrocarbons per hour per weight of catalyst (w./hour/w.). A preferred rate may be in the range from about 0.1 to about 1 w./hour/w.

The catalyst employed in producing carbon monoxide and hydrogen is preferably nickel on alumina, but other catalysts may be used such as iron-containing catalysts and cobalt molybdate on a support such as alumina where the amount of cobalt molybdate may range from about 0.1% to about 15% by weight and ordinarily less than 1% by weight. Silica-alumina may also be used as a catalyst. As examples of other catalysts, mention might be made of the metals, oxides, and sulfides of chromium, nickel, molybdenum, cobalt, platinum, palladium, tungsten, titanium, and the like or mixtures thereof.

Where a catalyst is not used it is desirable to employ a catalytically inert fluidizable solid such as quartz, alpha alumina, Carborundum, mullite, and the like. These inert solids should have the same particle size range as the catalytic solids.

When practicing the present invention in the absence of catalyst, temperatures in reaction zone may range from about 1800° to about 2400° F. while temperatures in the regenerator or carbon burning zone may be in the range from about 1900° to about 2500° F.

In the practice of the present invention, the catalyst is employed as a finely divided solid having a particle diameter in the range from about 1 to 5000 microns. A major amount of the catalyst may have particle diameters in the range from about 10 to 200 microns to insure good fluidization.

As a general statement, it will be desirable to employ in the practice of the present invention a suitable dehydrogenation catalyst, of which many are known to the art.

A particular feature of the present invention is the handling of the hot gases which are produced. These hot gases are substantially at the temperature at which they are produced and contain the catalyst, which is suitably in a finely divided fluidized condition, as a suspension. In order to separate this catalyst from the product, it is desirable and preferred to use a separation zone such as a cyclone separation zone and to recover the heat contained in the product stream containing the catalyst as a suspension. If the hot gaseous stream were routed directly to the cyclones and to the usual waste heat boiler where heat is recovered in the form of steam, difficulties would be encountered due to the tremendous heat stresses put on the metallic materials of construction. In accordance with the present invention, the gaseous product streams are quenched from the production temperature to a temperature in the range from about 600° to below about 1200° F. with a cooler stream of finely divided solids such as the catalyst, and thereafter the quenched stream is then further cooled in a waste heat boiler before being introduced into the cyclone separation zone. By virtue of this mode of operation, damage to the waste heat boiler and the cyclone separation zone is substantially prevented.

The present invention will be further illustrated by reference to the drawing wherein the sole figure is a flow diagram of a preferred mode. Referring now to the drawing, numeral 11 designates a charge line by way of which a feed hydrocarbon such as methane or natural gas is introduced into the system from a source not shown and then flows into a furnace 12 containing a coil 13 which raises the temperature of the methane to about 1400° F. for discharging by way of line 14 into a reaction zone 15. In reaction zone 15 the heated methane is formed in a suspension with a catalyst such as nickel on alumina and a dense bed results in the reaction zone 15, where substantially all the reaction occurs. The methane is reacted to form hydrogen and to lay down on the catalyst from about 0.5% to about 10% by weight of carbon. Ordinarily, the amount of carbon laid down may be in the preferred range from about 1% to about 5% by weight and usually will be about 1.5% by weight. The total carbon content of the catalyst leaving zone 15 usually will be about 2.5% by weight and preferably should not exceed 5% by weight, but may be in the range of 0.6 to about 10 weight percent. The product containing entrained catalyst in suspension is discharged by way of line 16 at a temperature of about 1800° F. The suspension in line 16 has admixed with it cool catalyst introduced by line 17 controlled by valve 18 from cyclone separation zone 19 with the cool stream being introduced into a waste heat boiler 19a, into which water from disengaging zone 20 is introduced by line 21 with the steam from the waste heat boiler 19a being introduced into drum 20 by line 22 with steam being recovered from drum 20 by line 23. The cool catalyst is then introduced by line 24 into zone 19 for separation of substantially all of the catalyst from the hydrogen-containing gas and for return of the catalyst by line 17 and branch line 25 to the reaction zone 15, it being noted that branch line 25 is controlled by valve 26.

The hydrogen-containing stream is withdrawn from zone 19 by line 27 and is introduced into a scrubber-cooler zone 28 into which cooling water is fed by line 29. The water from the scrubber-cooler 28 is discharged by line 30 while the scrubbed and cooled hydrogen is withdrawn by line 31 compressed in a compressor 32 and cooled in a cooler 33 and finally recovered as approximately 98.5% hydrogen by line 34.

The catalyst from reaction zone 15 containing a preferred amount of about 2.5% carbon thereon is withdrawn from zone 15 by line 35 and introduced into a regeneration zone 36. Oxygen in substantially purified condition is introduced by line 37 into a furnace 38 containing a heating coil 39 prior to being introduced by line 40 into zone 36. By virtue of the hot oxygen contacting the hot catalyst in zone 36, carbon monoxide is formed under the conditions prevailing therein and the hot carbon monoxide-containing gases are discharged from zone 36 by line 41. The catalyst which is substantially denuded of its carbon content but which may contain from about 0.1% to 9.5% by weight of carbon is introduced into zone 15 from zone 36 by line 42 for use as has been described. Preferred carbon content may be about 1.0 weight percent.

The product stream in line 41 contains a suspension of finely divided catalyst and is at an elevated temperature. In order for this hot gaseous stream to be handled properly, it is necessary for the temperature to be quenched and this is done by introducing into line 41 a cool stream of finely divided solids such as catalyst by line 43 controlled by valve 44 which quenches the temperature of the hot gaseous stream to a temperature within the range from about 600° to below about 900° F. The quenched gaseous stream is then introduced into waste heat boiler 45 into which water is introduced from disengaging drum 46 by line 47 and from whence steam is discharged by line 48 into disengaging drum 46 for recovery by line 49.

The quenched and cooled gaseous stream containing the catalyst is then introduced by line 50 into carbon monoxide cyclone separation zone 51 for separation of the catalyst from the carbon monoxide. The catalyst discharges from cyclone separation zone 51 by line 43 and is introduced in part to line 41 with the remainder being fed by branch line 52 controlled by valve 53 back into zone 36 for burning of the carbon from the catalyst by contact with the oxygen.

The carbon monoxide discharges from zone 51 by line 54 and is then routed thereby into a carbon monoxide scrubber-cooling zone 55 where it is contacted with water introduced by line 56 with water being discharged from zone 55 by line 57 and the scrubbed and cooled carbon monoxide being discharged by line 58 into a compressor 59 from whence it is discharged by line 60 through a cooler 61 for recovery as approximately 98.7% per carbon monoxide.

It will be clear from the foregoing description of the invention that a new and improved method is provided for producing pure hydrogen and pure carbon monoxide. The particular features of the present invention with reference to a mode of operation as described in the drawing is that favorable temperatures and pressures have been selected for high conversion of hydrocarbons to hydrogen and carbon. In the mode of operation no stripping medium is employed on the spent catalyst. Most of the hydrogen entrained in the spent catalyst from zone 15 is disengaged since, as the catalyst which leaves the reaction zone by line 35 has its density approximately doubled, in effect, this squeezes out most of the entrained vapor.

In the handling of the hot product gases in the cooling and separation zones, a very difficult problem exists ordinarily in that lining of the separation zones with fire brick is impractical because of erosion at the high gas velocities required. Furthermore, waste heat boilers comprise tubular type heat exchangers which encounter severe thermal stresses due to high temperature levels and gradients which exist. In the practice of the present invention, these problems are solved by employing a fluidized solids waste heat boiler system to cool the gas and recover the entrained catalyst. For example, in reaction zone 15 a superficial gas velocity of about 1 foot per second is used to minimize entrainment of catalyst to the waste heat boiler-cyclone system since high entrainment rates would be undesirable because of the resulting heat loss which would be effected. In the present invention, the circulating solids employed in the waste heat boiler-cyclone system may be the same as that used in the reaction zone 15 but other circulating solids may be used. The solid circulation rate may be set to cool the hydrogen from zone 15 to about 900° F. before entering the waste heat boiler 19 with the mixture of hydrogen and solids being cooled in the waste heat boiler to about 600° F. before discharging into the cyclone separation zone.

In the production of carbon monoxide a fluidized bed is maintained in zone 36 at a superficial gas velocity of about 1 foot per second with temperatures and pressures selected to form carbon monoxide by combustion of the carbon on the catalyst, heat balance being maintained by supplying the burned catalyst to the reaction zone 15 by line 42. Like in reaction zone 15, it is unnecessary to strip the catalyst leaving zone 36 because of the squeezing effects obtained by doubling the catalyst density in line 42.

The present invention allows control of temperature runaways and is therefore quite advantageous in that a major problem exists in mixing oxygen and carbon at about 2000° F. For example, the adiabatic flame temperature for the partial combustion of pure carbon and pure oxygen preheated to 1800° F. and 1400° F., respectively, is 6000° F. To avoid temperatures of this level, it is important in the practice of the present invention to employ as the circulating solid or catalyst a non-combustible material such as has been exemplified. The carbon deposited on the catalyst is carefully controlled such that about 1.5% by weight of carbon is usually deposited with about this same amount being removed in the regeneration zone 36, leaving about 1% by weight of the carbon on the regenerated catalyst. Thus, reaction of the pure carbon and pure oxygen may elevate the temperature from about 1800° to about 2000° F. Removal of all the carbon from the catalyst would elevate the temperature only to about 2150° F. Thus, in operating with a controlled amount of carbon deposited on the catalyst, only moderate increases in catalyst temperatures may occur and thus temperature runaways are prevented.

Also in the practice of the present invention, the carbon monoxide leaving zone 36 is cooled in a waste heat boiler-cyclone system similar to that used in the reaction zone 15. In this case, however, an added advantage of the present invention is that fouling of the heat exchanger tubes of waste heat boiler 45 is prevented since when carbon monoxide is cooled within the range from 1300° F. to above about 900° F., the carbon monoxide reacts to form carbon dioxide and carbon. The carbon normally would deposit on exchanger tubes as a film which ordinarily would necessitate frequent cleaning with resultant downtime of the equipment. In the practice of the present invention, this problem is solved by cooling the carbon monoxide to a temperature within the range from about 600° to below about 900° F. (for example, to about 800° F.) by injection of cooled finely divided solids into the hot stream of carbon monoxide. The carbon is deposited on the finely divided solids rather than on the metallic surfaces and thus has little effect since the catalyst solids ordinarily contain approximately 0.1% to 10% by weight of carbon. The quenched carbon monoxide stream is then cooled to a temperature in the range from about 500° to about 700° F.; for example, the carbon monoxide is cooled from about 800° to about 600° F. and carbon is not deposited in the heat exchanger tubes of the waste heat boiler 45 at these temperatures. The quenched stream is then further cooled in the waste heat boiler and the catalytic solids are separated from the carbon monoxide with the solids returned to the zone 36.

Thus, in accordance with the present invention, several advantages are apparent:

(1) A fluidized solids waste heat boiler-cyclone system prevents hot gases from flowing directly into the cyclones and heat exchangers.
(2) The fluidized solids waste heat boiler-cyclone system cools gases such as carbon monoxide to below a critical temperature where fouling of heat exchanger surfaces normally occurs.
(3) Control of the amount of carbon laid down on a catalyst prevents temperature runaways when reacting carbon with oxygen at high temperatures.

Thus the present invention is quite advantageous and useful.

As an example of the practice of the present invention, methane in an amount of about fifty million cubic feet a day is heated to about 1400° F. at 40 pounds per square inch gauge and then introduced into a reaction zone containing a nickel on alumina catalyst operating at a temperature of 1800° F. and about 30 pounds per square inch gauge. The hydrogen and catalyst containing stream is quenched to a temperature of about 900° F. with cooled catalyst from the cyclone separation zone before routing to a waste heat boiler where the catalyst and hydrogen are further cooled to about 600° F. prior to introduction into the cyclone separation zone. The hydrogen is discharged at 600° F. and 20 pounds per square inch gauge, and after scrubbing and cooling, 98,500,000 cubic feet of 98.5% hydrogen is recovered.

The spent catalyst containing a total of about 2.3 weight percent of carbon is contacted with oxygen at 1400° F. and 40 pounds per square inch gauge in a reaction zone to burn off the carbon on the catalyst down to about 1% by weight and to form a product stream containing carbon monoxide and catalyst at about 2000° F. and 30 pounds per square inch gauge. This stream is quenched with cooled catalyst to about 800° F. prior to introduction into a waste heat boiler for steam generation and for cooling to 600° F. prior to separation of the catalyst from the carbon monoxide. As a result, the carbon monoxide discharges from the separation zone at 600° F. and after scrubbing and cooling, forty-eight million, five hundred thousand cubic feet of 98.7% carbon monoxide are recovered.

The carbon monoxide and hydrogen are suitably used in the reduction of iron ore or may be used in the manufacture of chemicals. There are many uses for carbon monoxide and hydrogen in the petroleum industry and in the chemical industry.

The nature and objects of the present invention having been completely described and illustrated, what I wish to claim as new and useful and secure by Letters Patent is:

1. A method for producing a hydrogen stream and a carbon monoxide stream which comprises feeding a hydrocarbon into a reaction zone containing a fluidized dehydrogenation catalyst at a temperature within the range from about 1300° to about 2400° F. under conditions to deposit from about 0.1% to about 10% by weight of carbon on said catalyst and to form a product containing substantial amounts of hydrogen, separating said product from the carbon-containing catalyst, contacting said carbon-containing catalyst with substantially pure oxygen at a temperature within the range from about 1400° to about 2500° F. under conditions to form a second product in admixture with substantially carbon-free catalyst containing substantial amounts of carbon monoxide, cooling said admixture in a cooling zone to a temperature within the range from about 500° to about 700° F., introducing the cooled admixture into a separation zone and there separating catalyst from said second product, and separately recovering said hydrogen and carbon monoxide-containing products, said admixture being quenched to a temperature within the range from about 600° to below about 900° F. prior to cooling by adding to said admixture a portion of the cooled catalyst, said cooling and separation zones having exposed metallic surfaces.

2. A method for producing a hydrogen stream and a carbon monoxide stream which comprises feeding a hydrocarbon into a reaction zone containing a fluidized dehydrogenation catalyst at a temperature within the range from about 1300° to about 2400° F. under conditions to deposit from about 0.1% to about 10% by weight of carbon on said catalyst and to form a product in a first admixture with said catalyst containing substantial amounts of hydrogen, cooling said first admixture in a first cooling zone to a temperature within the range from about 500° to about 700° F., introducing the cooled admixture into a separation zone and there separating said product from the cooled carbon-containing catalyst, contacting said carbon-containing catalyst with substantially pure oxygen at a temperature within the range from about 1400° to about 2500° F. under conditions to form a second product in a second admixture with substantially carbon-free catalyst containing substantial amounts of carbon monoxide, cooling said second admixture in a second cooling zone to a temperature within the range from about 500° to about 700° F., introducing the cooled second admixture into a second separation zone and there separating cooled, substantially carbon-free catalyst from said second product, and separately recovering said hydrogen- and carbon monoxide-containing products, said admixtures being quenched to a temperature within the range from about 600° to below about 1200° F. prior to cooling by adding to said first admixture a portion of the cooled carbon-containing catalyst and by adding to the second admixture a portion of the cooled, substantially carbon-free catalyst, said cooling and separation zones having exposed metallic surfaces.

3. A method for handling hot carbon monoxide at an elevated temperature within the range from about 1400° to about 2500° F. in cooling and separating zones having exposed metallic surfaces which comprises admixing a stream of said carbon monoxide with a relatively cool fluidized stream of finely divided solids at a temperature within the range from about 500° to about 700° F. to quench the temperature of said hot carbon monoxide to a temperature within the range from about 600° to below about 900° F., and then further cooling said carbon monoxide to a temperature within the range from about 500° F. to about 700° F., and separating said finely divided solids from said last cooled carbon monoxide.

4. A method in accordance with claim 3 in which the solids are a supported catalyst.

5. A method for handling hot carbon monoxide at an elevated temperature within the range from about 1400° to about 2500° F. in a steam generation zone and a cyclone separation zone having exposed metallic surfaces which comprises admixing a stream of said carbon monoxide with a relatively cool fluidized stream of finely divided solids to quench the temperature of said hot carbon monoxide to a temperature within the range from about 600° to below about 900° F., and then further cooling said carbon monoxide in said steam generation zone to a temperature within the range from about 500° F. to about 700° F., and separating said finely divided solids in said cyclone separation zone from said last cooled carbon monoxide.

6. A method for handling hot carbon monoxide at an elevated temperature within the range from about 1400° to about 2500° F. in cooling and separating zones having exposed metallic surfaces which comprises admixing a stream of said carbon monoxide with a relatively cool stream of finely divided solids to quench the temperature of said hot carbon monoxide to a temperature within the range from about 600° to below about 900° F., and then further cooling said carbon monoxide to a temperature within the range from about 500° F. to about 700° F., and separating said finely divided solids from said last cooled carbon monoxide.

7. A method in accordance with claim 5 in which the finely divided solids have catalytic properties.

8. A method for handling hot carbon monoxide at an elevated temperature within the range from about 1400° to about 2500° F. in cooling and separating zones having exposed metallic surfaces which comprises admixing a stream of said carbon monoxide with a relatively cool stream of finely divided solids to quench the temperature of said hot carbon monoxide to a temperature within the range from about 600° to below about 900° F., and then further cooling said carbon monoxide to a temperature within the range from about 500° F. to about 700° F., and separating said finely divided solids from said last cooled carbon monoxide, and then employing said separated finely divided solids to quench said hot carbon monoxide.

9. A method for handling hot carbon monoxide at an elevated temperature within the temperature range from about 1400° to about 2500° F. in cooling and separating zones having exposed metallic surfaces which comprises mixing a stream of said hot carbon monoxide with a relatively cool stream of finely divided solids to quench the temperature of said hot carbon monoxide to a temperature within the range from about 600° to below about 900° F. and then further cooling said carbon monoxide to a temperature within the range from about 500° to about 700° F. and separating said finely divided solids from said last cooled carbon monoxide.

References Cited in the file of this patent

UNITED STATES PATENTS

| | | |
|---|---|---|
| 2,389,636 | Ramseyer | Nov. 27, 1945 |
| 2,471,104 | Gohr | May 24, 1949 |
| 2,675,294 | Keith | Apr. 13, 1954 |
| 2,690,963 | Herbst | Oct. 5, 1954 |
| 2,805,177 | Krebs | Sept. 3, 1957 |
| 2,885,267 | Buehmann et al. | May 5, 1959 |

FOREIGN PATENTS

| | | |
|---|---|---|
| 695,492 | Great Britain | Aug. 12, 1953 |